(12) United States Patent
Decker

(10) Patent No.: US 11,105,594 B2
(45) Date of Patent: Aug. 31, 2021

(54) PIVOTABLE ARROWHEAD ASSEMBLY

(71) Applicant: Matthew G. Decker, Alcester, SD (US)

(72) Inventor: Matthew G. Decker, Alcester, SD (US)

( * ) Notice: Subject to any disclaimer, the term of this patent is extended or adjusted under 35 U.S.C. 154(b) by 0 days.

(21) Appl. No.: 16/931,039

(22) Filed: Jul. 16, 2020

(65) Prior Publication Data
US 2021/0018304 A1 Jan. 21, 2021

Related U.S. Application Data

(60) Provisional application No. 62/874,793, filed on Jul. 16, 2019.

(51) Int. Cl.
F42B 6/08 (2006.01)
A01K 81/04 (2006.01)

(52) U.S. Cl.
CPC .............. F42B 6/08 (2013.01); A01K 81/04 (2013.01)

(58) Field of Classification Search
CPC .................................. A01K 81/04; F42B 6/08
See application file for complete search history.

(56) References Cited

U.S. PATENT DOCUMENTS

| | | | |
|---|---|---|---|
| 2,745,204 A | 5/1956 | Myers | |
| 3,910,579 A | 10/1975 | Sprandel | |
| 4,615,529 A | 10/1986 | Vocal | |
| 4,685,239 A | 8/1987 | LaMonica | |
| 4,807,382 A | 2/1989 | Albrecht | |
| 4,982,523 A | 1/1991 | Garton | |
| 5,033,220 A | 7/1991 | Phelps | |
| 5,094,463 A * | 3/1992 | Dryden | F42B 12/385 342/386 |
| 7,651,421 B2 * | 1/2010 | Smith | F42B 6/04 473/582 |
| 7,935,012 B2 | 5/2011 | Lee | |
| 8,016,703 B1 * | 9/2011 | Kronengold | F42B 6/08 473/582 |
| 8,052,554 B2 | 11/2011 | Lee | |
| 8,157,679 B2 | 4/2012 | Cyr et al. | |
| 8,480,520 B2 * | 7/2013 | Webber | F42B 6/08 473/582 |
| 9,658,036 B2 * | 5/2017 | Zobell | F42B 6/08 |
| 9,739,581 B2 * | 8/2017 | Zobell | F42B 6/08 |
| 9,772,169 B2 * | 9/2017 | Greenwood | F42B 6/04 |
| 9,879,956 B2 * | 1/2018 | Derus | F42B 6/08 |
| 2008/0263932 A1 * | 10/2008 | Butler | A01K 81/04 43/6 |

FOREIGN PATENT DOCUMENTS

GB 407846 3/1934

* cited by examiner

*Primary Examiner* — John A Ricci
(74) *Attorney, Agent, or Firm* — Robert C. Corbett; Technology Law, PLLC

(57) ABSTRACT

An arrow includes an arrowhead and a shaft. An assembly interconnects the shaft and the arrowhead such that, in one position, the assembly substantially rigidly interconnects the arrowhead and the shaft to prevent or restrict angular or radial movement of the arrowhead relative to the shaft, and to prevent axial movement of the arrowhead relative to the shaft in one axial direction. A spring resists movement of the arrowhead relative to the shaft in the other axial direction. When the spring force is overcome, the assembly permits the arrowhead to pivot relative to the shaft while maintaining the connection between the arrowhead and the shaft.

10 Claims, 6 Drawing Sheets

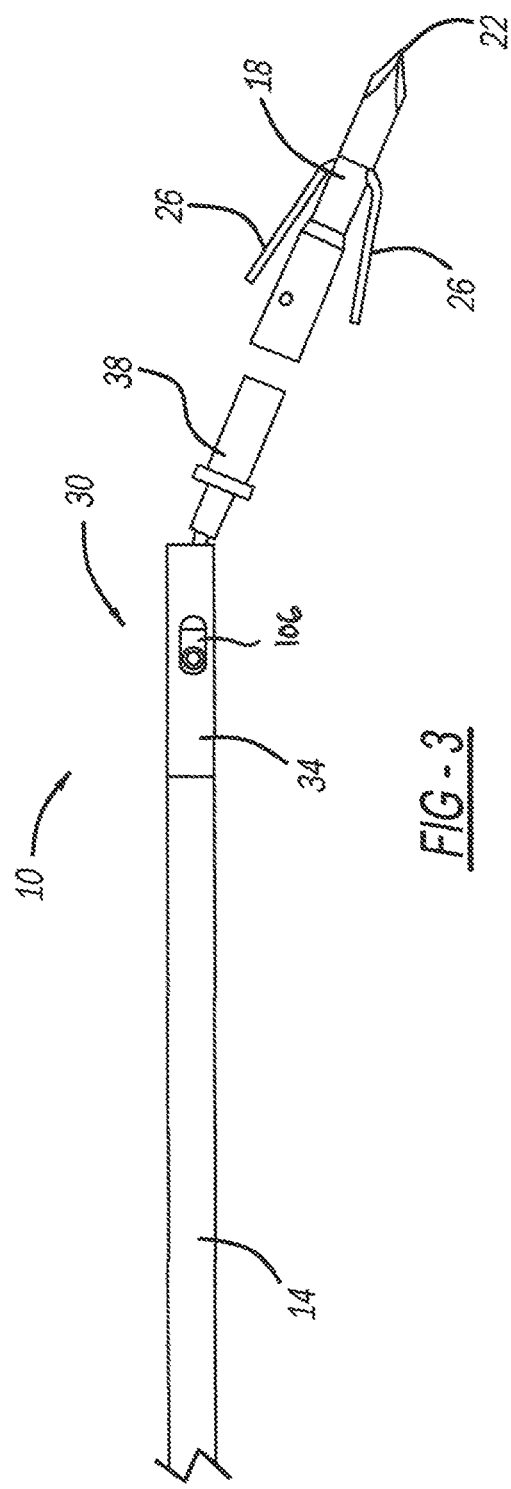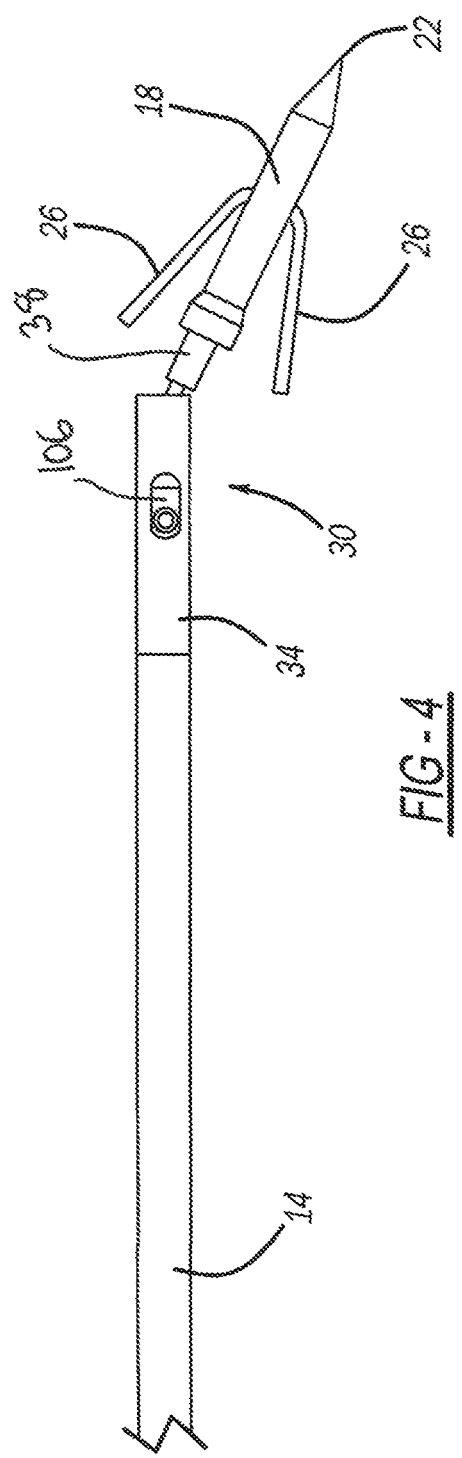

PIVOTABLE ARROWHEAD ASSEMBLY

CROSS-REFERENCE TO RELATED APPLICATION

This application claims the benefit of U.S. Provisional Application No. 62/874,793, filed Jul. 16, 2019, and which is hereby incorporated by reference in its entirety.

TECHNICAL FIELD

This disclosure relates to arrowheads for use in archery.

BACKGROUND

Bowfishing involves the use of an arrow, launched by a bow or a crossbow, to catch fish. In bowfishing, an arrow must not only pierce a fish, but must also retain the fish. In order to prevent loss of the fish, arrowheads typically include barbs. However, as the fish moves in an attempt to avoid capture, the barbs of prior art arrowheads tear and destroy the flesh of the fish, rendering the flesh of the fish less desirable for human consumption or potentially allowing the fish to be released from the arrow, resulting in the loss of the fish.

SUMMARY

An arrow includes an arrowhead and a shaft. A tube is mounted with respect to one of the shaft and the arrowhead. The tube has an end and an inner surface defining a bore with first and first and second protuberances extending from the inner surface into the bore. A spring extends into the bore. An insert is mounted with respect to the other of the shaft and the arrowhead. The insert has first, second, and third segments. The first segment is operatively connected to one of the arrowhead and the shaft. The third segment defines first and second grooves.

The insert is movable between a first position and a second position. When the insert is in the first position, the second segment abuts the end of the tube such that axial movement of the insert in a first axial relative to the insert is prevented by physical part interference between the second segment and the end of the tube. Also, when the insert is in the first position, the third segment is within the bore such that radial movement of the insert relative to the tube is prevented or limited by physical part interference between the inner surface of the tube and the third segment of the insert. Further when the insert is in the first position, the first protuberance is within the first groove and the second protuberance is within the second groove such that rotation of the insert relative to the tube is prevented or restricted by physical part interference between the insert and the protuberances. And further, when the insert is in the first position, the spring contacts the insert such that the spring resists movement of the insert relative to the tube in a second axial direction.

Accordingly, when the insert is in the first position, the insert and the tube, and thus the arrowhead and the shaft, are substantially rigidly connected to each other, which provides accuracy to the arrow during flight and during impact with a target.

When the insert is in the second position, the insert is pivotable with respect to the tube, and thus the arrowhead is pivotable with respect to the shaft, which prevents or reduces damage to the target's flesh when the target attempts to flee after being pierced by the arrowhead. The insert is movable to the second position when sufficient force is applied to overcome the resistance of the spring, which occurs when the target attempts to flee or the shooter exerts force to retrieve the target.

In one embodiment, the insert is substantially rigid, which improves the ease of moving the insert from the second position to the first position.

A corresponding adapter for modifying arrows is also provided herein.

BRIEF DESCRIPTION OF THE DRAWINGS

FIG. 3 is a schematic, partially exploded, side view of the arrow assembly of FIGS. 1 and 2 with the adaptor in a second mode of operation in which the arrowhead is pivotable with respect to the shaft;

FIG. 4 is a schematic, side view of the arrow assembly of FIGS. 1-3 with the adaptor in the second mode of operation and the arrowhead pivoted with respect to the shaft;

DESCRIPTION OF THE PREFERRED EMBODIMENTS

Figure 1:
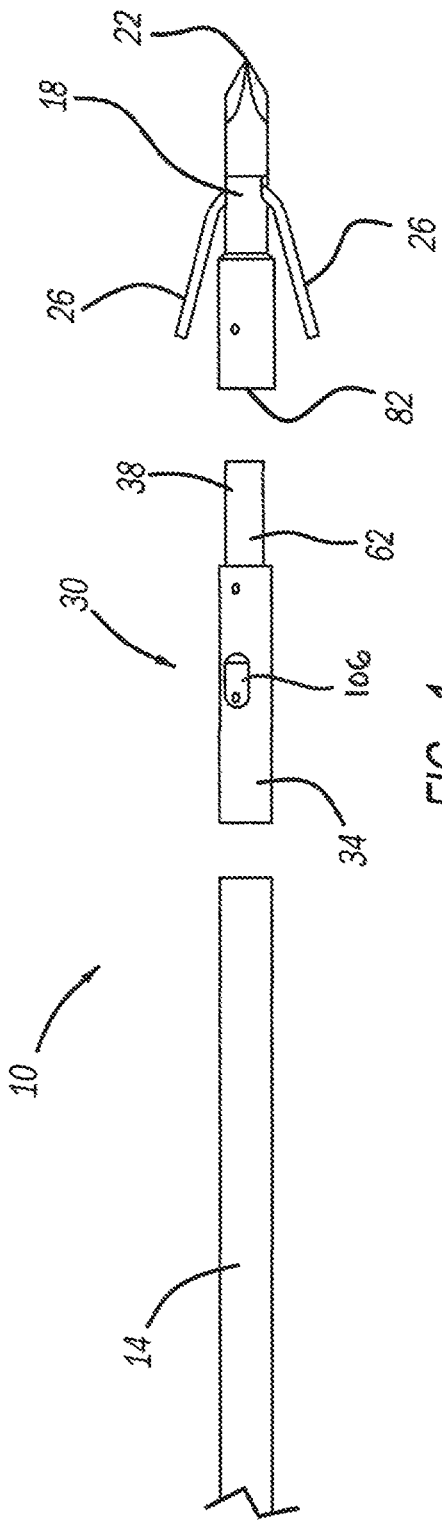
FIG. 1 is a schematic, partially exploded, side view of an arrow assembly including a shaft, an arrowhead, and an adaptor having an insert and a tube.

Referring to the Figures, wherein like reference numbers refer to like components throughout, an arrow assembly 10 is schematically depicted. The arrow assembly includes a shaft 14, as understood by those skilled in the art. The arrow assembly 10 also includes an arrowhead 18. The arrowhead 18 is operatively connected to the shaft 14 and defines one end of the arrow assembly 10. The arrowhead 18 in the embodiment depicted is configured for use during bow fishing, and includes a relatively sharp tip 22 and protruding barbs 26. However, other arrowhead configurations and uses may be employed within the scope of the claimed invention.

The arrow assembly 10 also includes an adaptor 30 that interconnects the arrowhead 18 and the shaft 14. The adaptor 30 provides the arrow assembly 10 with two modes of operation. In the first mode of operation, the arrowhead is retained in alignment with the shaft 14. In the second mode, the arrowhead 18 is pivotable with respect to the shaft.

The adaptor 30 includes a tube 34 and an insert 38. The tube 34 in the embodiment depicted is characterized by a cylindrical outer surface 42. The inner surface 44 of the tube 34 defines a cylindrical bore 46 that is open at both ends 50, 54 of the tube 34. The bore 46 has a first bore segment 58 having a first diameter. The shaft 14 is inserted into the first bore segment 58 through one of the ends 50. The first diameter is minimally larger than the diameter of the shaft 14 such that the shaft 14 contacts the inner surface 44 along the first bore segment 58, thereby retaining the shaft 14 in alignment with the tube 34.

The insert 38 includes a cylindrical first insert segment 62, a cylindrical second insert segment 66, a generally cylindrical third insert segment 70, a cylindrical fourth insert segment 74, and a fifth insert segment 78. The arrowhead 18 defines a cylindrical hole 82. The first insert segment 62 is inserted into the hole 82 to retain the arrowhead 18 to the adaptor 30. Adhesive or other fasteners are used to secure the arrowhead 18 to the insert 38 for unitary movement therewith. Similarly, adhesive or other fasteners are used to secure the shaft 14 to the tube 34.

The tube 34 defines two threaded holes 90 that extend through the wall of the tube 34 from the outer surface 42 to the inner surface 44 at a second bore segment 86 of bore 46. The adaptor 30 includes two threaded fasteners 94. Each of the fasteners 94 engages, and extends through, a respective one of the threaded holes 90 such that a portion of each fastener 94 protrudes from the inner surface 44 into a second bore segment 86. Accordingly, the fasteners 94 form protuberances extending radially into the bore 46 from the inner surface 44. The tube 34 also defines another threaded hole 98 and an oblong hole 102 that extend from the outer surface 42 to the inner surface 44. The adaptor 30 includes an L-shaped leaf spring 106 that defines a hole 110. Hole 110 is aligned with hole 98, and a threaded fastener 112 extends through both holes 110, 98 to secure the spring 106 to the tube 34 such that one leg 114 of the spring 106 extends through hole 102 and extends radially into the second bore segment 86.

Figure 2:
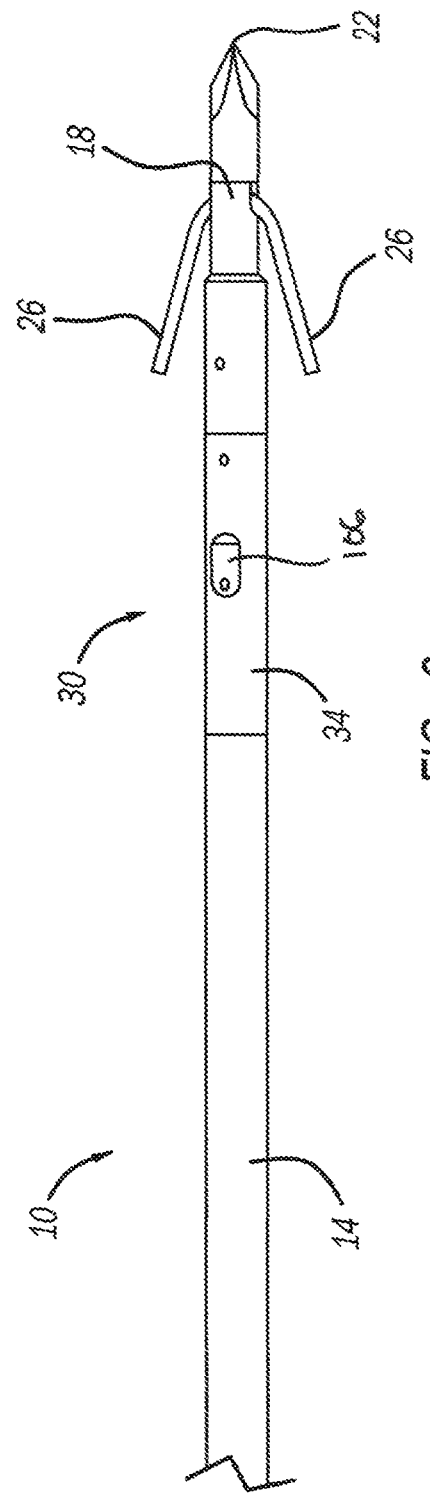
FIG. 2 is a schematic, side view of the arrow assembly of FIG. 1 with the adaptor in a first mode of operation in which the arrowhead is substantially rigidly connected to the shaft via the adaptor.
Figure 5:
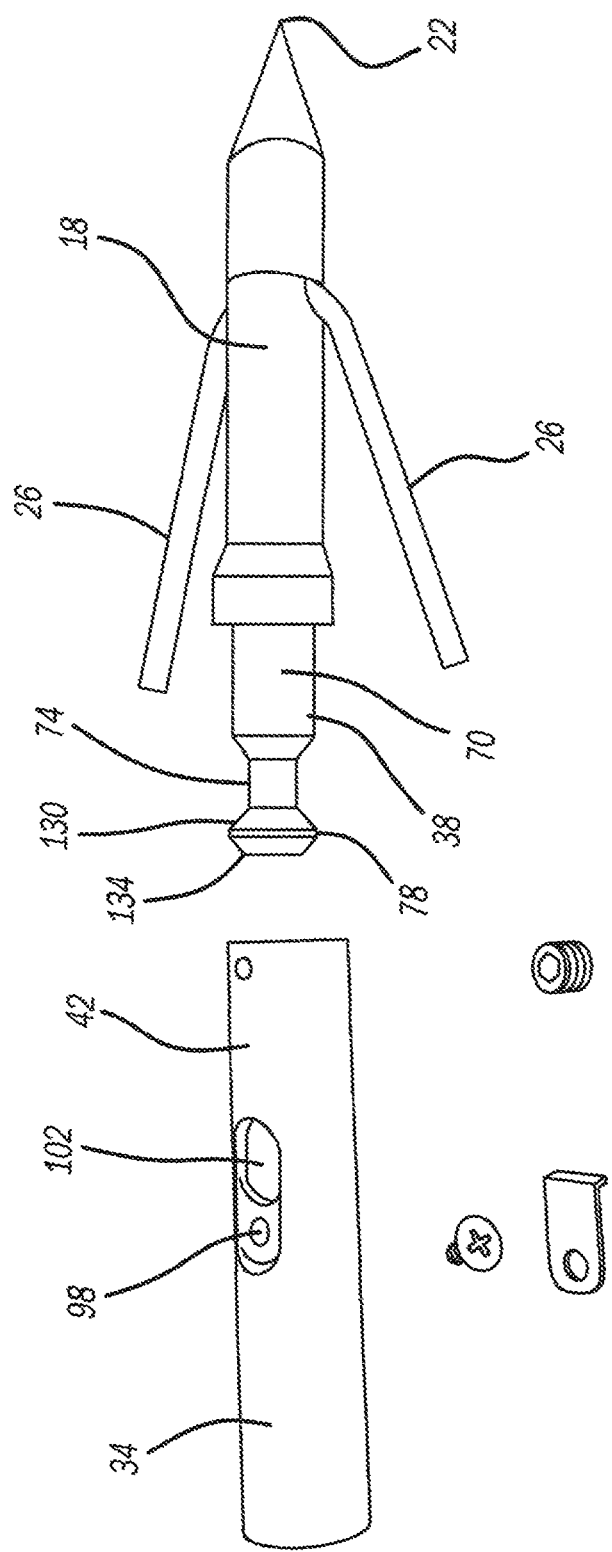
FIG. 5 is a schematic, exploded view of the adaptor with the arrowhead attached thereto.
Figure 6:
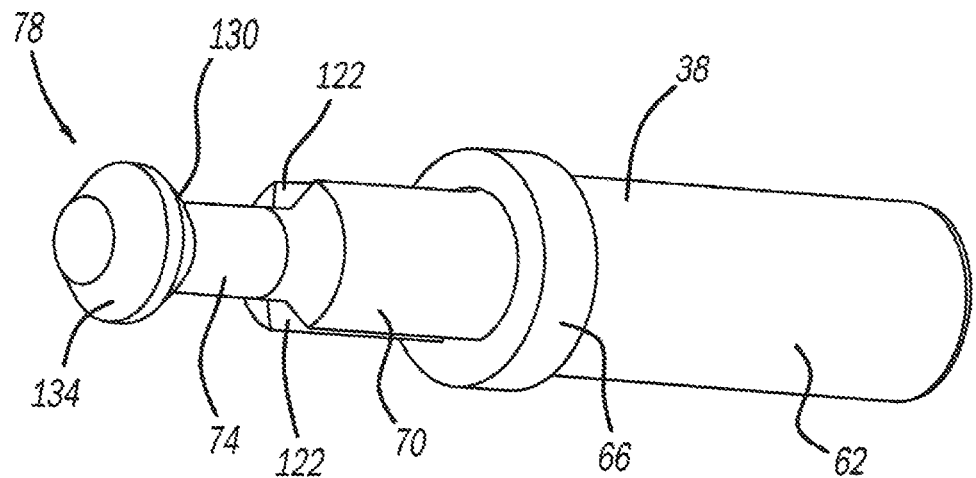
FIG. 6 is a schematic, perspective view of the insert of the adaptor.
Figure 7:
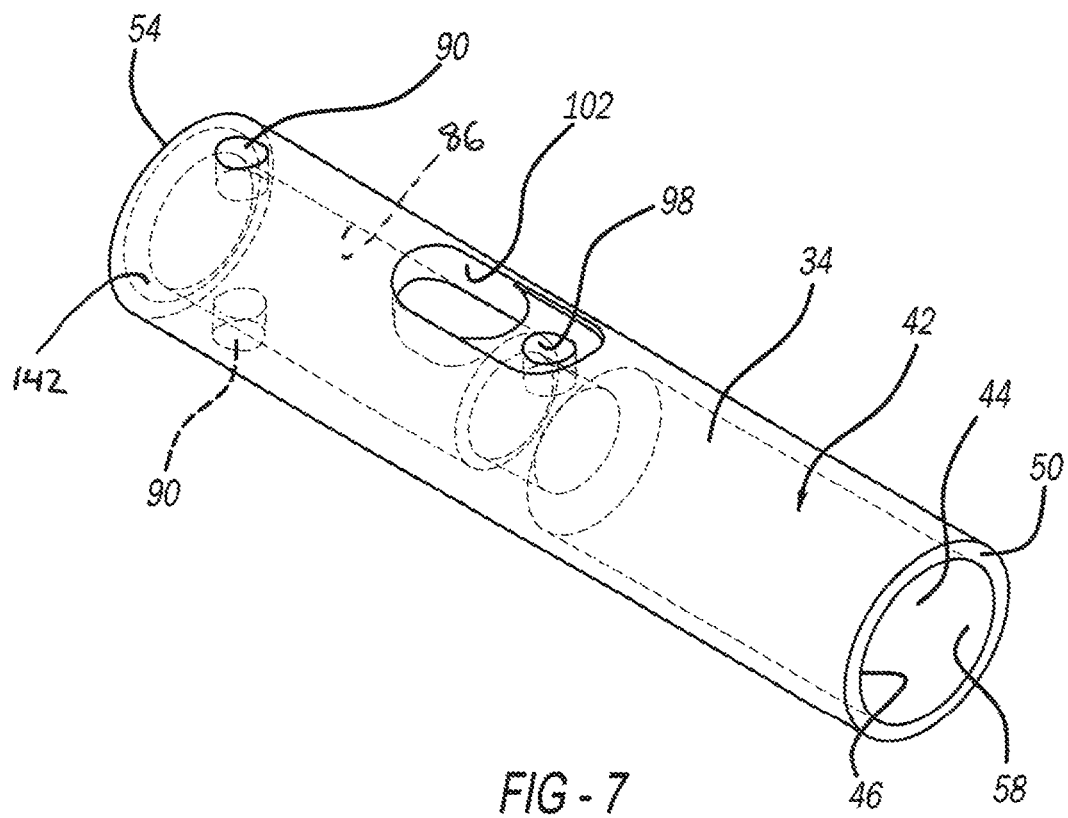
FIG. 7 is a schematic, perspective view of the tube of the adaptor.
Figure 8:
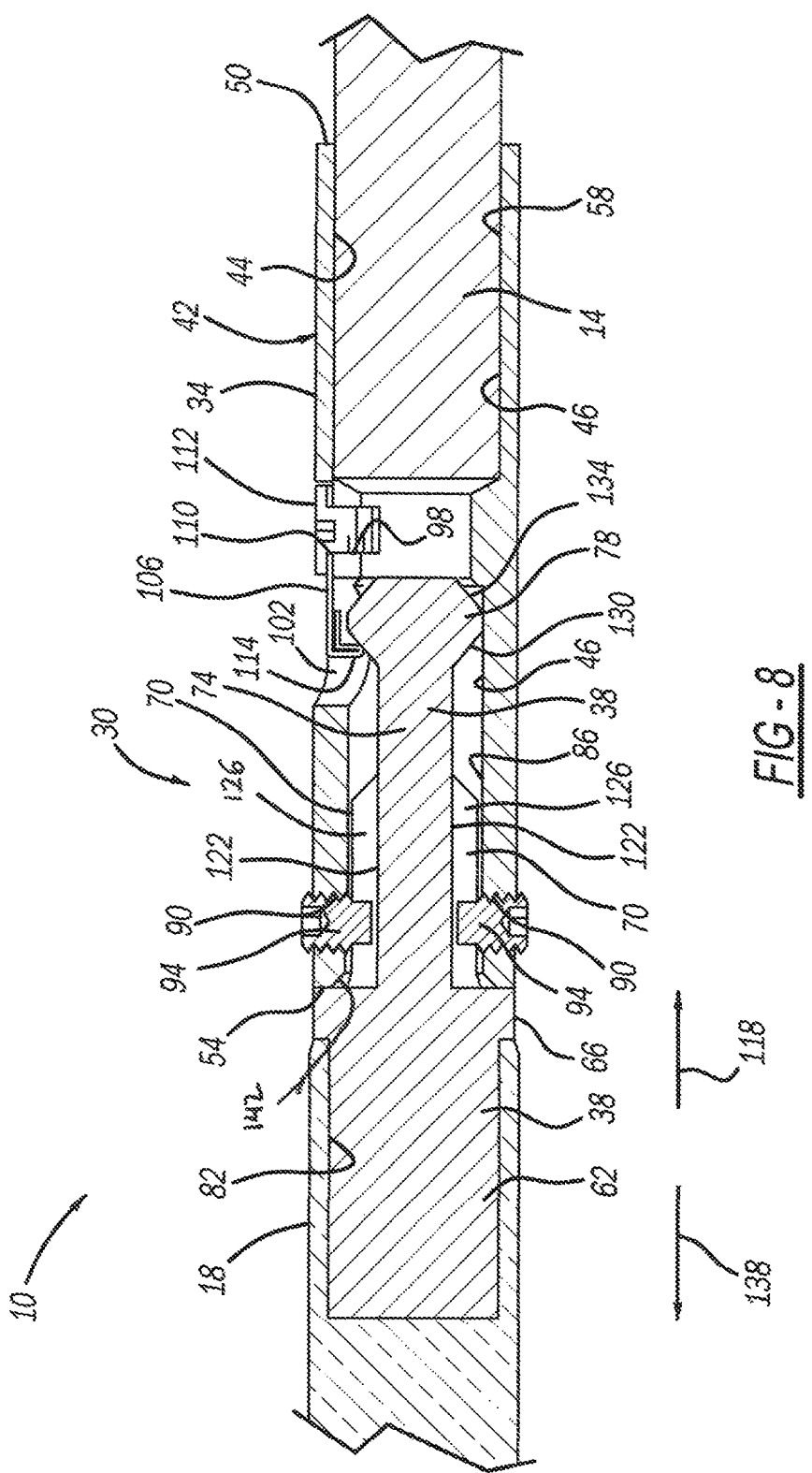
FIG. 8 is a schematic, sectional, side view of the adaptor in the first mode of operation.
Figure 9:
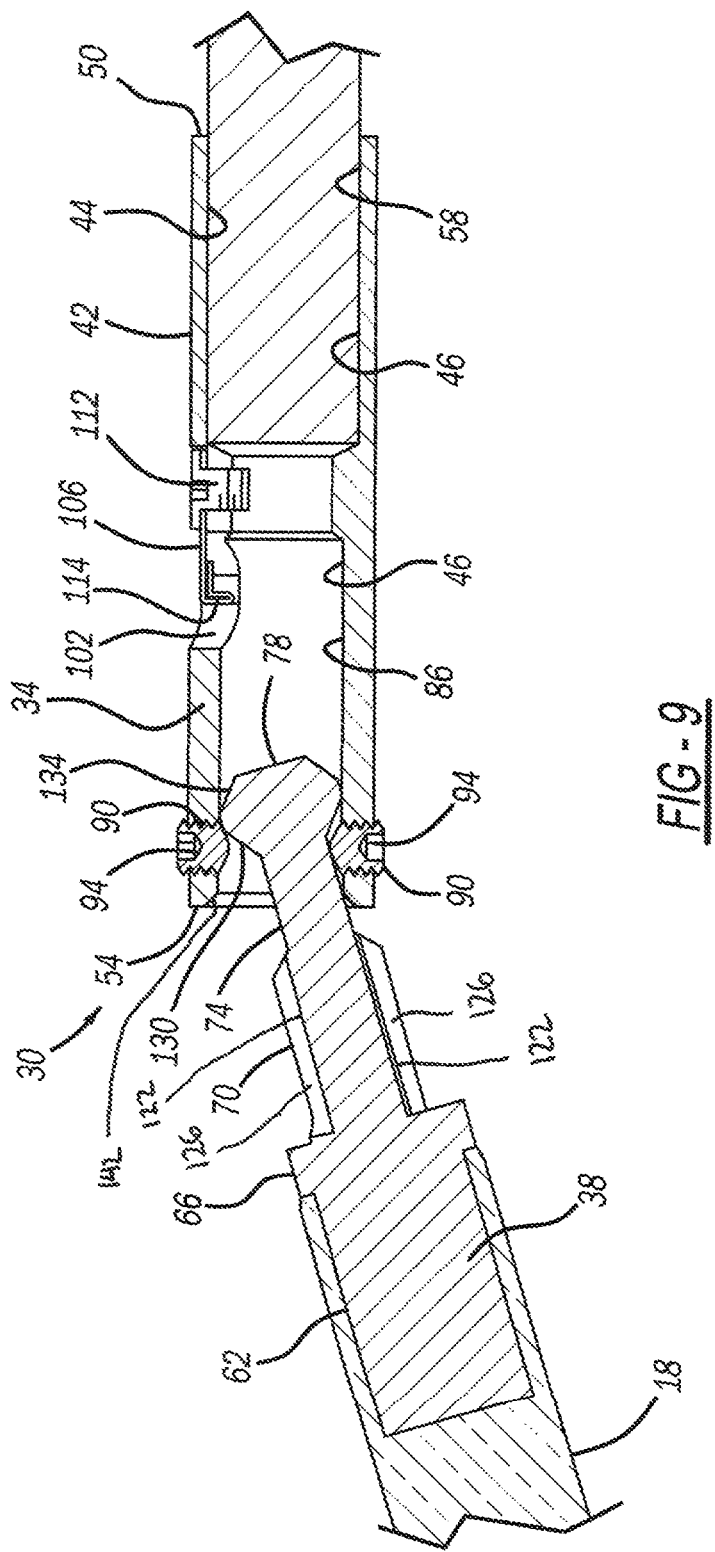
FIG. 9 is a schematic, sectional, side view of the adaptor in the second mode of operation.

The insert 38 is selectively movable with respect to the tube 34 between a first position, as shown in FIGS. 1-2 and 8, and a second position, as shown in FIGS. 3-4 and 9. Referring specifically to FIG. 8, when the insert 38 is in the first position, the insert 38 is retained in alignment with the tube 34 and the shaft 14. The arrowhead 18 is attached to the insert 38; therefore the arrowhead 18 is also retained in alignment with the tube 34 and the shaft 14 when the insert 38 is in the first position.

More specifically, the third, fourth, and fifth insert segments 70, 74, 78 are inserted into the second bore segment 86 of the bore 46 through end 54. The second insert segment 66 has a diameter larger than the diameter of the bore 46 at the end 54; accordingly, the second insert segment 66 rests against the end 54. The interaction of the tube 34 and the second insert segment 66 prevents movement of the insert 38, and thus the arrowhead 18, relative to the tube 34 and the shaft 14 in one axial direction 118.

The diameter of the third insert segment 70 is minimally smaller than the diameter of the second bore segment 86; accordingly, interaction between the third insert segment 70 and the inner surface 44 at the second bore segment 86 prevents radial movement of the insert 38, and thus the arrowhead 18, relative to the tube 34 and the shaft 14.

The third insert segment 70 defines two grooves 122. Each of the fasteners 94 extends into a respective one of the grooves 122. Accordingly, the interaction between the walls 126 of the grooves 122 and the fasteners 94 restricts or limits rotation of the insert 38, and thus the arrowhead 18, with respect to the tube 34 and the shaft 14.

The fourth insert segment 74 extends between the third and fifth insert segments 70, 78. The diameter of the fourth insert segment 74 is less than the diameters of the third and fifth insert segments 70, 78. In the embodiment depicted, the fourth insert segment 74 has the same diameter as the grooves 122. The fifth insert segment 78 has two portions 130, 134 with varying diameter. Portion 130 extends from the fourth insert segment 74; portion 130 is beveled or tapered such that the diameter of portion 130 increases with increasing distance from the fourth insert segment 74. Portion 134 extends from portion 130 to the terminus of the insert 38. Portion 134 is beveled or tapered such that the diameter of portion 134 decreases with distance from portion 130 and the fourth segment 74.

The leg 114 of the spring 106 contacts portion 130 when the insert 38 is in the first position, as shown in FIG. 8, thereby resisting movement of the insert 38 and arrowhead relative to the tube 34 and shaft 14 in another axial direction 138 that is opposite axial direction 118. Accordingly, the arrowhead 18 and the insert 38 are prevented or resisted in moving in any direction relative to the tube 34 and the shaft 38.

Exerting a force on the insert 38 in direction 138, or on the tube 34 in direction 118, sufficient to overcome the bias of the spring 106 causes the insert 38 and the arrowhead 18 to move axially in direction 138 to the second position shown in FIG. 9. That is, sufficient force will cause the movement of the insert 38 in direction 138, which will cause the leg 114 of spring 106 to traverse portion 130; the bevel or taper of portion 130 causes deformation of the spring 106 as the leg 114 is pushed radially outward. Once the portion 130 is past the leg 114, the spring 106 is no longer in contact with the insert 38 and/or does not resist movement of the insert 38.

Referring specifically to FIG. 9, when the insert 38 is in the second position, the third insert portion 70 is outside the bore 46 and therefore does not limit or restrict movement of the insert 38. The fifth insert segment 78 is wider than the distance between fasteners 94, and therefore interference between the fasteners 94 and the fifth insert segment 78 prevents removal of the fifth insert segment 78 from the bore 46. The insert 38, and therefore the arrowhead 18, is free to pivot and/or swivel relative to the tube 34 and the shaft 14 and with movement of the fish. The insert 38 is movable relative to the tube 34 within a cone-shaped range of movement.

The adapter 30 can be attached between the arrow shaft and any barbed point available on the market. As used herein, an "arrow" may include a crossbow bolt. The arrowhead can also be integrally formed as part of the adapter within the scope of the claimed invention. The tube and the insert are heat-treated steel in one embodiment, though other materials may be employed within the scope of the claimed invention. The two halves (tube 34 and insert 38) snap together with small amount of resistance and held in place by a leaf spring. The spring 106 could be plastic or spring steel, design shown in pictures utilizes spring steel. The two halves (i.e., 34, 38) also self-align because of the chamfer at the end 54 of the tube and the mating chamfer just after the ball 78 on the point half.

This device is rigid and does not pivot or rotate when in the closed position. After shooting an arrow into a fish, the pull force from the fish pulls the two halves 34, 38 partially apart allowing the barbed point to swivel and pivot freely with the motion of the fish. This prevents tearing and therefore reduces lost fish. After removing the fish, the two halves push back together and snap into closed position and are held there by the leaf spring. The adaptor option allows you to use this system with any bowfishing point on the market today.

If point only goes into fish but does not pass through, the pivot/swivel and point assembly can be pushed through as it would on a normal point because the two halves self-align with push force. This is because the insert 38 is made of a substantially rigid, solid material, as opposed to something flexible such as a cable. It should be noted that the tube 34 may be connected to the arrowhead and the insert 38 connected to the shaft within the scope of the claimed invention.

While the best modes for carrying out the invention have been described in detail, those familiar with the art to which this invention relates will recognize various alternative designs and embodiments for practicing the invention within the scope of the appended claims.

The invention claimed is:

1. An arrow assembly comprising:
   a shaft;
   an arrowhead;
   a tube mounted with respect to one of the shaft and the arrowhead;
   said tube having an end and an inner surface defining a bore with first and second protuberances extending from the inner surface into the bore;
   a spring extending into the bore;
   an insert mounted with respect to the other of the shaft and the arrowhead;
   said insert having first, second, and third segments, said first segment being operatively connected to one of the arrowhead and the shaft, said third segment defining first and second grooves;
   said insert being movable between a first position and a second position;
   wherein, when the insert is in the first position, said second segment abuts the end of the tube such that axial movement of the insert in a first axial direction relative to the insert is prevented by physical part interference between the second segment and the end of the tube, said third segment is within the bore such that radial movement of the insert relative to the tube is prevented or limited by physical part interference between the inner surface and the third segment, said first protuberance is within the first groove and said second protuberance is within the second groove such that rotation of the insert relative to the tube is prevented or restricted by physical part interference, and said spring contacts the insert such that the spring resists movement of the insert relative to the tube in a second axial direction; and
   wherein, when the insert is in the second position, the insert is pivotable with respect to the tube.

2. The arrow assembly of claim 1, wherein said insert includes a fourth segment and a fifth segment;
   wherein said fifth segment includes a first beveled portion that increases in diameter with distance from the fourth segment and a second beveled portion that decreases in diameter with distance from the fourth segment; and
   wherein the spring contacts the first beveled portion when the insert is in the first position.

3. The arrow assembly of claim 2, wherein the maximum diameter of the fifth segment is greater than the distance between the first and second protuberances.

4. The arrow assembly of claim 3, wherein the fifth segment contacts the first and second protuberances when the insert is in the second position.

5. The arrow assembly of claim 1, wherein the insert is movable from the first position to the second position when a predetermined amount of force is exerted on the insert in the second axial direction.

6. An adapter for use with an arrow having an arrowhead and a shaft, the adapter comprising:
   a tube mountable with respect to one of the shaft and the arrowhead;
   said tube having an end and an inner surface defining a bore with first and second protuberances extending from the inner surface into the bore;
   a spring extending into the bore;
   an insert mountable with respect to the other of the shaft and the arrowhead;
   said insert having first, second, and third segments, said first segment being operatively connectable to one of the arrowhead and the shaft, said third segment defining first and second grooves;
   said insert being movable between a first position and a second position;
   wherein, when the insert is in the first position, said second segment abuts the end of the tube such that axial movement of the insert in a first axial direction relative to the insert is prevented by physical part interference between the second segment and the end of the tube, said third segment is within the bore such that radial movement of the insert relative to the tube is prevented or limited by physical part interference between the inner surface and the third segment, said first protuberance is within the first groove and said second protuberance is within the second groove such that rotation of the insert relative to the tube is prevented or restricted by physical part interference, and said spring contacts the insert such that the spring resists movement of the insert relative to the tube in a second axial direction; and
   wherein, when the insert is in the second position, the insert is pivotable with respect to the tube.

7. The adapter of claim 6, wherein said insert includes a fourth segment and a fifth segment;
   wherein said fifth segment includes a first beveled portion that increases in diameter with distance from the fourth segment and a second beveled portion that decreases in diameter with distance from the fourth segment; and
   wherein the spring contacts the first beveled portion when the insert is in the first position.

8. The adapter of claim 7, wherein the maximum diameter of the fifth segment is greater than the distance between the first and second protuberances.

9. The adapter of claim 8, wherein the fifth segment contacts the first and second protuberances when the insert is in the second position.

10. The adapter of claim 6, wherein the insert is movable from the first position to the second position when a predetermined amount of force is exerted on the insert in the second axial direction.

\* \* \* \* \*